United States Patent
Bates

[15] 3,700,972
[45] Oct. 24, 1972

[54] WIRE OPERATED REMOTE CONTROL SYSTEM

[72] Inventor: Reginald A. Bates, Chittenango, N.Y.

[73] Assignee: Pass & Seymour, Inc., Syracuse, N.Y.

[22] Filed: April 16, 1971

[21] Appl. No.: 134,772

[52] U.S. Cl. ............... 317/137, 307/112, 307/114, 310/67, 317/140
[51] Int. Cl. ............................................. H01h 47/22
[58] Field of Search ...... 317/137, 140; 307/112, 114; 310/68 R, 68 A, 68 D, 66, 67

[56] References Cited

UNITED STATES PATENTS 2,892,132   6/1959   Mallory .................... 317/137

Primary Examiner—William M. Shoop, Jr.
Assistant Examiner—Harry E. Moose, Jr.
Attorney—Witherspoon and Lane

[57] ABSTRACT

A system for remotely controlling the energization of a load is disclosed. The system may be used for example to turn on and off lights, motors and the like. With this system the voltage being controlled is not utilized for control purposes. The system comprises a switch capable of generating a control voltage and a relay assembly actuated by the switch. The switch assembly comprises a magnet and coil so arranged that movements of the switch handle causes the magnet to rotate and induce a voltage in the coil. This voltage is transmitted by wire to the relay assembly which comprises an "on" reed relay, an "off" reed relay and a power relay. The power relay comprises an "on" latch coil and an "off" latch coil. When the "on" latch coil is energized voltage is applied to the load and when the "off" latch coil is energized the voltage is removed from the load.

19 Claims, 7 Drawing Figures

INVENTOR
REGINALD A. BATES

BY *Witherspoon & Lane*
ATTORNEYS

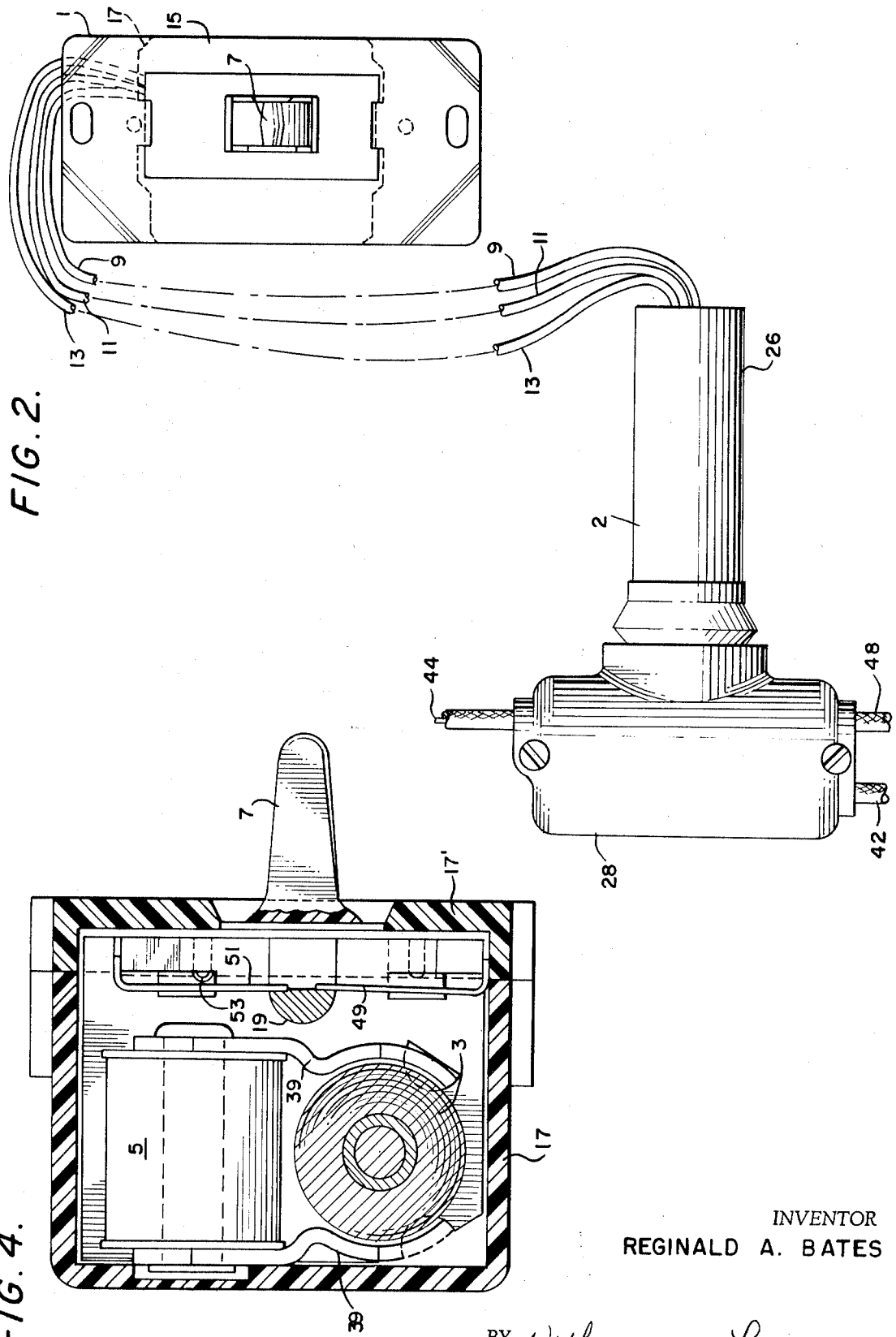

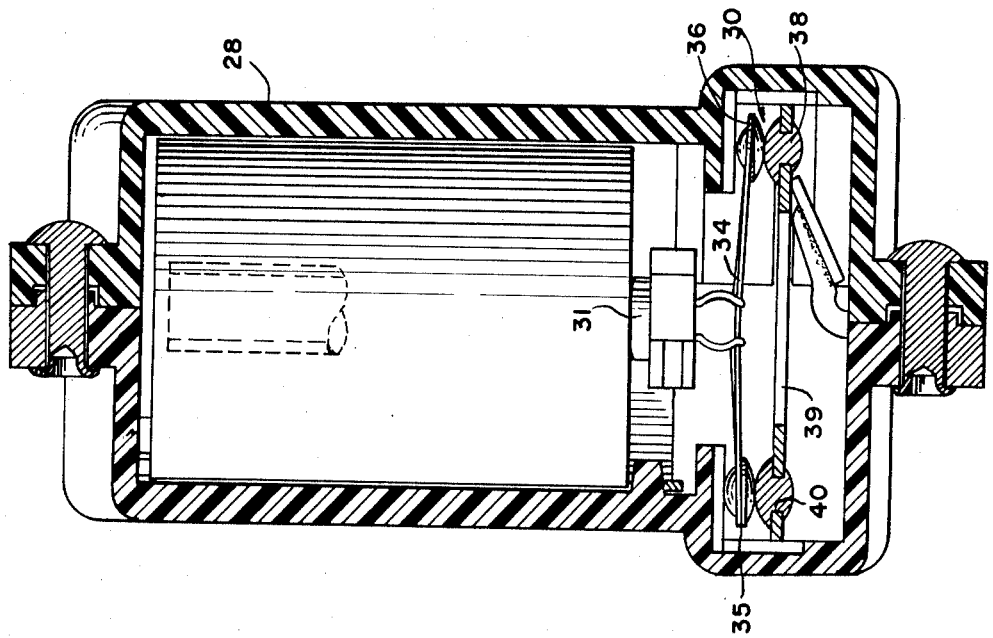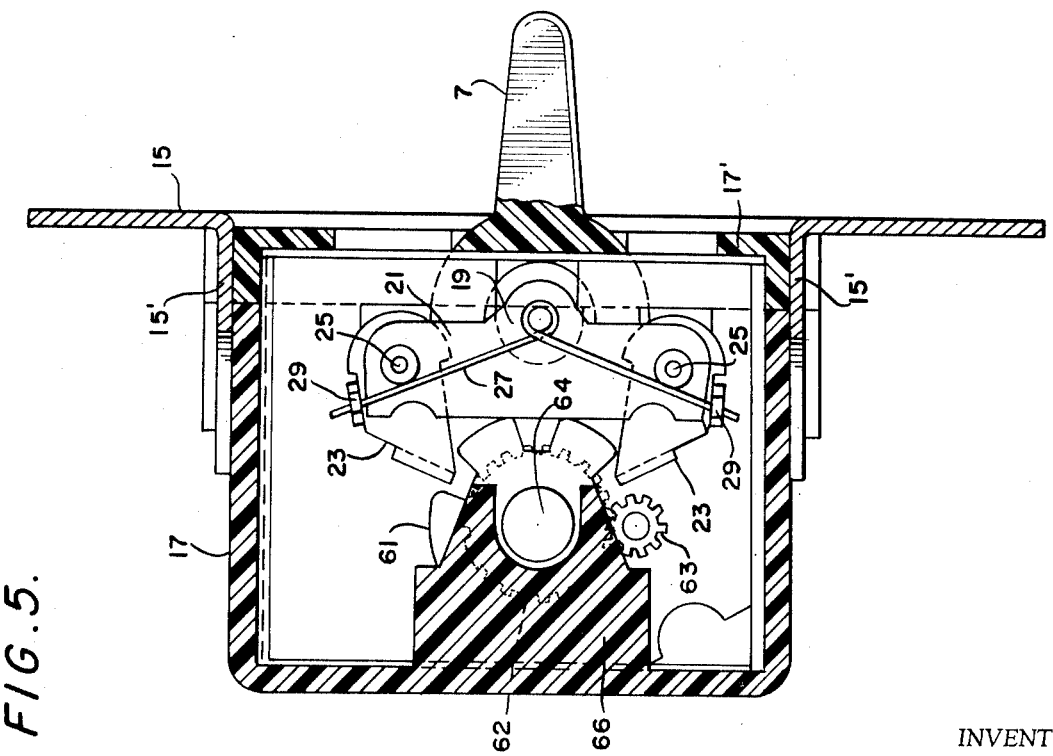

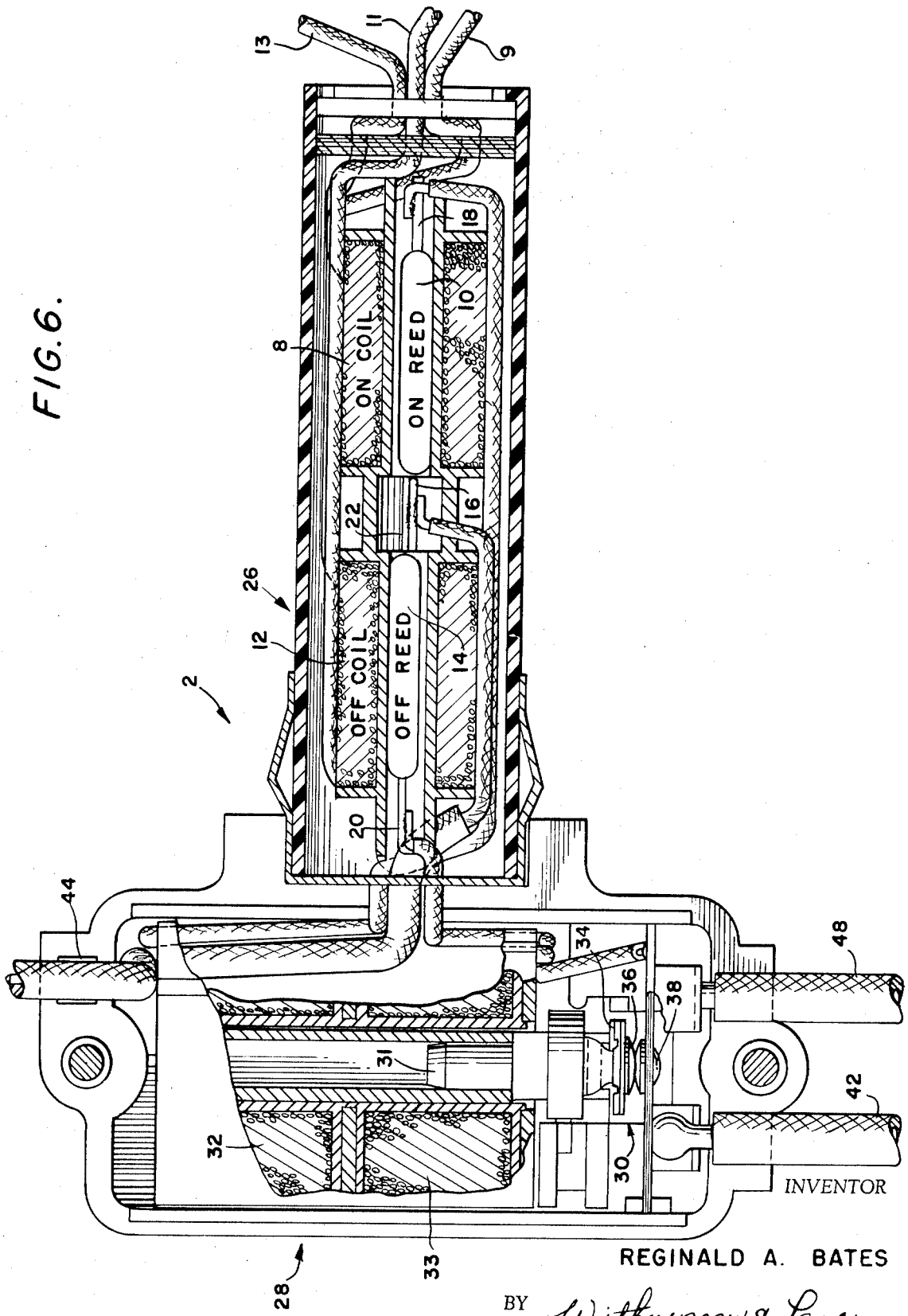

WIRE OPERATED REMOTE CONTROL SYSTEM

BACKGROUND OF THE INVENTION

This invention relates to remote control systems and more specifically to control systems for remotely controlling the energization of a load.

Remote control systems for applying a voltage to or removing a voltage from a load such as a motor, a light or lighting system and the like are well known in the art. Generally, these systems utilize the voltage being controlled for control purposes. A transformer is generally utilized to step down the controlled voltage and this reduced voltage is used for control purposes. For example, in one system used to control house lighting the 120 volts is stepped down to 24 volts and this 24 volts is used as the control voltage. All such systems require a step down transformer and wiring of sufficient size to handle the current requirement. At today's prices the costs of installing such a system are considerable.

Furthermore, the electrical characteristics of the transformers used on such existing remote control systems are such that the ohmic voltage drop limits the length of normally used control wire sizes to relatively short distances.

These costs can be materially reduced if a low voltage can be obtained from a source other than the voltage being controlled. In such a system the need for a step down transformer is eliminated and if the source provides a low current pulse the wiring requirement is greatly reduced. This invention provides such a system. The control voltage is generated by the system itself and the voltage being controlled is no way utilized for control purposes. Thus, this invention cannot only be utilized in conventional remote control systems such as the control of lighting in a house or other building but can also be used in an environment where contact arcing or heat generated by the prior art systems could cause a fire or an explosion, for example in a hydrogen environment.

In addition, the high impedance of the generator winding used in apparatus of this invention provides considerable insensitivity to the impedance of the control wiring and, therefore, this invention permits control over distances considerably greater than the distances that can be provided with the above-mentioned transformer type remote control systems.

SUMMARY OF THE INVENTION

This invention comprises a switch assembly and relay assembly utilized to control the voltage applied to a load. The switch assembly includes a magnet and coil arrangement for generating a low voltage pulse when the switch is actuated. This low voltage pulse is transmitted by means of wires to the relay assembly. The relay assembly is actuated by the low voltage pulse from the switch assembly to energize or de-energize the load as the case may be. The switch assembly includes a switch arm that is operated in one direction to energize a load and is operated in the opposite direction to de-energize the load. The load voltage is in no way utilized to provide the control voltage.

It is therefore an object of this invention to provide a remote control system.

It is another object of this invention to provide a wire operated remote control system.

It is a further object of this invention to provide a remote control system in which the voltage being controlled is not utilized for control purposes.

It is a further object of this invention to provide a remote control system in which the control voltage is generated by the system.

It is a further object of this invention to provide a remote control system in which the control wiring is at zero potential except during the brief periods of actuation, thereby minimizing electrical stress on the control wiring and minimizing the energy that failure of the wiring could release into a hazardous environment.

It is a further object of this invention to provide a remote control system that permits control over distances substantially greater than is generally possible with the conventional prior art transformer type of remote control systems.

BRIEF DESCRIPTION OF THE DRAWINGS

The above-mentioned and other objects of the invention will become apparent from the following detailed description of the invention when read in conjunction with the annexed drawings in which like parts of the various figures have like numbers and in which:

FIG. 2 is a pictorial view showing the switch and relay assemblies of the invention;

FIG. 4 is a sectional view of the switch assembly of the invention showing the magnet and coil arrangement of the switch assembly;

FIG. 5 is another sectional view of the switch assembly showing some of the details of the switch;

FIG. 6 is a sectional view showing the relay assembly in detail; and

FIG. 7 is a partial section of the relay assembly showing the load power switch contacts.

DESCRIPTION OF THE INVENTION

Figure 1:
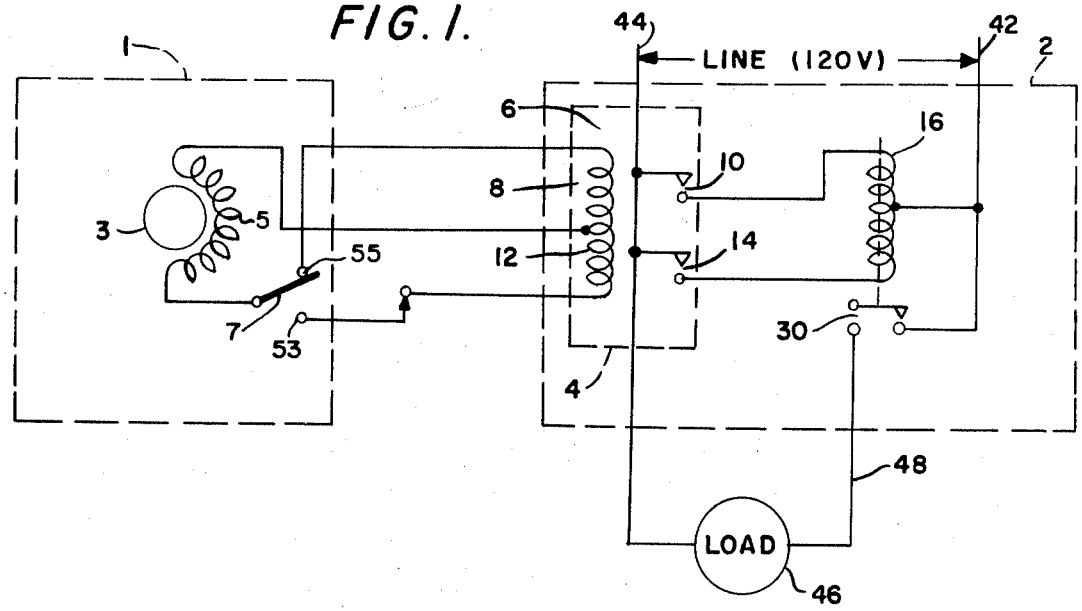
FIG. 1 is a schematic diagram showing the electrical features of the invention.

FIG. 1 is a schematic diagram showing the electrical equivalent of the structural elements of the invention. The circuitry designated within the dotted box 1 is the circuitry of the switch assembly and the circuitry shown enclosed in the dotted box 2 is the circuitry of the relay assembly. The circuitry within the dotted box 4 represents a pair of reed relays. One reed relay comprises the upper half 8 of the coil 6 and switch 10 and the second reed relay comprises the lower half 12 of coil 6 and switch 14. The line voltage is connected to the lines 42 and 44. Line 44 is shown as being directly connected to the load 46 and line 42 is connected to load 46 through the switch 30 and line 48. Double solenoid 16 is used to open and close switch 30 to thereby apply or remove the line voltage from load 46.

The switch assembly 1 is shown in FIG. 1 as comprising a magnet 3, a coil 5 and a switch arm 7. As will be apparent later the magnet 3 and coil 5 provide a source of control voltage. When switch arm 7 is closed on the contact 55 the reed relay comprising upper half 8 of coil 6 is energized. Energizing this relay closes contact 10 thereby applying line voltage across the upper solenoid of double solenoid 16. Energizing upper solenoid 16 from the line voltage closes switch 30. When switch 30 is closed, the line voltage is placed across load 46. Switch 30 is a latch type switch that remains closed once closed even though contact 10 is reopened.

Figure 3:
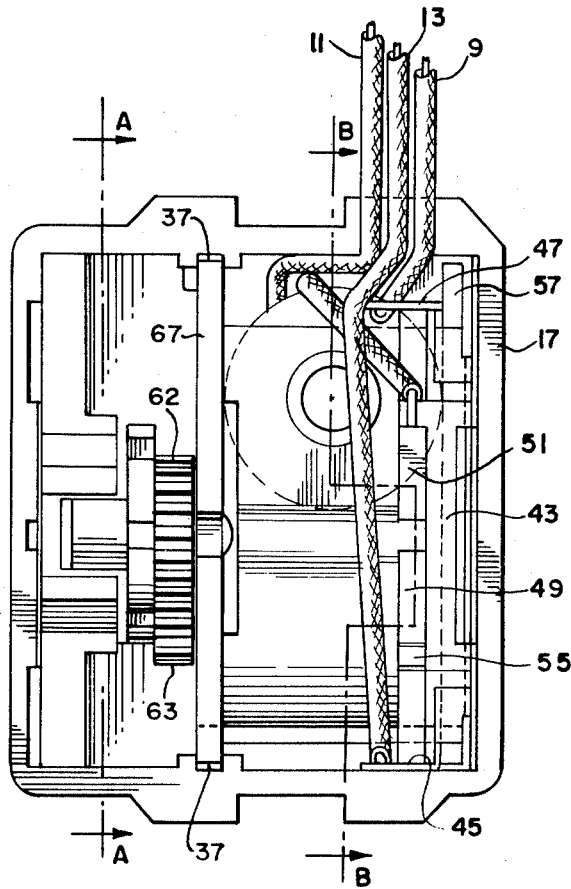
FIG. 3 is a front view of the switch assembly with the faceplate removed.

If now switch arm 7 is closed on contact 53, the reed relay comprising lower half 12 of coil 6 will be energized. Energizing this relay closes contact 14 and places the line voltage source across the lower solenoid of double solenoid 16. When the lower solenoid is energized, switch 30 is opened thereby removing the line voltage from load 46. Load device 46 may be any load such as for example a house light, a motor, a piece of equipment, a piece of machinery and the like. Furthermore, as is obvious load 46 can be located at any place remote from the switch assembly 1. The wires 9, 11 and 13 in FIG. 3 are run from switch assembly 1 to the relay assembly 2. For example, in a remote control house lighting system, remote control switches are generally placed in the master bedroom and the garage so that the lights in the house can be selectively turned on and off from either the master bedroom or the garage. Thus, a switch assembly 1 or plurality of switch assemblies identical to switch assembly 1 would be located in both the bedroom and garage to control the house lights throughout the entire house.

Now that the operation and basic electrical characteristics of the invention have been described, the structural elements of the invention will be described by referring to FIGS. 2-7. Referring first to FIG. 2 which pictorially illustrates a front view of the switch assembly 1 and a side view of the relay assembly 2, switch assembly 1 is shown as comprising a faceplate 15 and a switch arm 7. Faceplate 15 provides a cover for the switch housing 17. As is apparent from FIG. 2, switch assembly 1 is constructed to resemble a conventional on-off switch and does resemble such a switch except for the fact that switch arm 7 is normally in the mid position as shown in FIG. 2 rather than up or down as is the case with a conventional on-off switch. The reason that switch arm 7 is normally in the mid position will be apparent later. Switch assembly 1 is so fabricated and dimensioned that it can be mounted into any conventional switch box. The relay assembly is shown as comprising a first cylindrical housing 26 and a second cylindrical housing 28. Cylindrical housing 26 houses the reed relays and cylindrical housing 28 houses the power relay. These two housings are joined to form a generally T-shaped structure. Switch assembly 1 and relay assembly 2 which are normally located remote from each other are electrically interconnected by means of the leads 9, 11 and 13.

The structure of switch assembly 1 is shown in detail in FIGS. 3, 4 and 5. FIG. 3 is a front view of the switch assembly with faceplate 15 removed and FIGS. 4 and 5 are sectional views taken along the lines BBB and AA of FIG. 3, respectively. As shown in these figures the switch mechanism is housed in a housing 17 which together with cover 17' forms an enclosure for the switch mechanism. Faceplate 15 includes flanges 15' that slip over cover 17' and housing 17 to hold cover 17' on housing 17. Switch assembly 1 includes a switch arm 7 that has a handle protruding through the cover 17'. The other end of switch arm 7 is fabricated in the form of a hollow half-cylinder and a cylindrical crossmember 19 that extends across the width of the switch is mated with this part of the switch arm 7 and secured thereto by any suitable means. A bar 21 integrally formed with cylindrical member 19 extends at right angles from the longitudinal axis of member 19 as shown in FIG. 5. A pawl 23 is secured to each end of bar 21 by any suitable means such as the rivets 25. The pawls 23 are secured to bar 21 in such a manner that they are free to rotate about the axis of rivets 25. The rotational movement of pawls 23 is spring biased by means of a spring 27. The spring 27 has two arms each of which extends through a closed channel 29 integrally formed on each of the pawls 23. The center of spring 27 is held in place along the axis of cylindrical member 19 by any suitable means. A sprocket 61 having a gear 62 integrally formed therewith is mounted directly in back of the switch arm mechanism. This sprocket and gear combination is rotatably mounted on an insulator board 67 shown in FIG. 3. Channels 37 are formed in housing 17 to accommodate insulator board 67. A smaller gear 63 is secured below and in mating contact with gear 62. This smaller gear 63 is attached to magnetic rotor 3. Rotor 3 which is a cylindrical permanent magnet is more clearly shown in FIG. 4. A coil 5 is mounted directly above cylindrical magnet 3. Pole pieces 39 extend from coil 5 down and partially around cylindrical magnet 3. Cylindrical magnet 3 and coil 5 form a generator with coil 5 serving as the armature of the generator. Operation of this generator will become apparent later in the specification. An axel 64 of sprocket 61 rests in a bearing 66 secured to housing 17.

Lead 11 is electrically connected to armature coil 5 and extends directly out of switch assembly 1 from armature coil 5 as shown in FIG. 3. A second lead 41 is electrically connected between armature coil 5 and common contact 43. Lead 13 is connected to a terminal 45 and lead 9 is connected to a terminal 47. A leaf spring 49 is integrally formed with terminal 45 and a second leaf spring 51 is integrally formed with terminal 47. Leaf springs 49 and 51 and terminals 47 and 49 are fabricated from a conductive material. Contact points 53 and 55 of common contact 43 are located directly adjacent leaf springs 51 and 49, respectively. Terminals 47 and 45 are mounted on a second insulator board 57. Common contact 43 is detachably mounted on insulator board 57 and the contact points 53 and 55 (FIG. 4) protrude through slits cut in insulator board 57.

The end of cylindrical member 19, shown in FIG. 4, is actually a half-cylinder. That is this end of member 19 is shaped to have a flat surface upon which leaf springs 49 and 51 rest as is clearly shown in FIG. 4. Leaf springs 49 and 51 rest on the flat surface of member 19 away from contacts 55 and 53 when arm 7 is in the control position, shown in FIGS. 2, 3 and 4.

Movement of the handle of switch arm 7 in a downward direction rotates member 19 in a clockwise direction and closes leaf spring 51 on contact 53. Similarly movement of switch arm 7 in an upward direction rotates member 19 in a counter-clockwise direction and closes leaf spring 49 on contact 55.

Now that the structural elements of switch assembly 1 have been described the operation of this switch will be described. Referring to FIG. 5, when switch arm 7 is moved in an upward direction the upper pawl 23 engages sprocket 61 and drives sprocket 61 in a clockwise direction. The motion of sprocket 61 is transmitted to cylindrical magnet 3 by means of gears 65 and 63. Rotation of magnet 3 between the pole pieces 39 induces a voltage in armature coil 5. While the ratio between gears 62 and 63 is not critical, a 3 to 1 ratio has been found to be satisfactory. With a 3 to 1 gear ratio movement of switch arm 7 60° rotates cylindrical magnet 3 180°. Movement of switch arm 7 in an upward direction closes leaf spring 49 on contact 55 as is shown in FIG. 4. Therefore, the voltage impulse induced in armature coil 5 appears across leads 13 and 11. As soon as switch arm 7 is released it returns to the central or neutral position shown in FIGS. 4 and 5 due to the influence of spring 27.

If now switch arm 7 is moved from the neutral position in a downward direction, the lower pawl 23 will drive sprocket 61 in a counter-clockwise direction. Again this motion is transmitted to cylindrical magnet 3 by means of gears 62 and 63. Movement of switch arm 7 in a downward direction closes leaf spring 51 on contact 53. Therefore, the voltage induced in armature coil 5 will appear across leads 9 and 11.

From the foregoing discussion of the operation of switch assembly 1, it is obvious that switch assembly 1 is actually a voltage generator. The voltage generated by movement of switch arm 7 is a low voltage pulse that is used to control the relay assembly 2.

Relay assembly 2 is shown in detail in FIGS. 6 and 7. FIG. 6 is a cross sectional view of the entire relay assembly and FIG. 7 is a partial cross section showing the power switching contacts. As shown in FIG. 6 relay assembly 2 comprises a first reed relay having a reed coil 8 surrounding the reed switch 10. A second reed relay having a reed coil 12 surrounding a reed switch 14 is also provided. Reed switches 10 and 14 are conventional reed switches presently available on the market. The contacts of reed switch 10 are brought out of the switch by means of leads 18 and 16. Similarly, the contacts of reed switch 14 are brought out from the switch by means of leads 20 and 22. Coil 8 and reed switch 10 form the "on" control relay and coil 12 and reed switch 14 form the "off" control relay as indicated in FIG. 6.

The power switching section 28 of relay assembly 2 comprises a first solenoid 32 and a second solenoid 33. The solenoid plunger 31 is connected to the upper contact arm 34 of an over center switch mechanism 30. Switch mechanism 30 comprises upper contact arm 34 having a contact 35 at one end and a contact 36 at the other end, and a lower contact arm 39 having a contact 38 at one end thereof and a contact 40 at the other end. Lead 44 which is equivalent to lead 44 in FIG. 1 is the common lead that is connected directly to the load, the power source and to reed switches 10 and 14. Lead 42 is connected to the source side of switch 30 and lead 48 is connected to the load side of switch 30. Thus, the load is connected between lines 48 and 44. As was stated above switch 30 is an over center switch mechanism. When solenoid 33, the "off" latch solenoid, is energized plunger 31 is attracted upward thereby causing contacts 35 and 36 to be pushed downward. The downward movement of contacts 35 and 36 pushes contacts 40 and 38 downward and contact 38 is snapped open. If now solenoid coil 32, which is the "on" solenoid coil, is energized plunger 31 will again move upward as shown in FIG. 6, contacts 35 and 36 will again move downward and contact 38 will snap up into the position shown in FIG. 7. When the contacts are as shown in FIG. 7, the line voltage is connected to the load. While switch 30 has been shown as a particular over center switch mechanism, any suitable switch mechanism that will both make and break on the upward movement of plunger 31 can be utilized for switch 30.

Now that the structural details of both the switch assembly and the relay assembly have been described in detail, the overall operation will be described. For sake of clarity assume load 46 shown in FIG. 1 is an incandescent lamp and that the lamp is turned "off." If one now desires to turn on the lamp, he pushes switch arm 7 in the "on" direction which in FIGS. 4 and 5 is downward. This downward motion of switch arm 7 rotates cylindrical magnet 3 thereby inducing a voltage in armature coil 5 and at the same time closes leaf spring 51 on contact 53. The voltage induced in coil 5 is transmitted via lines 9 and 11 since spring contact 51 is closed on contact 53 to the "on" coil 8. This pulse energizes coil 8 thereby closing reed switch 10. When reed switch 10 is closed, the line voltage is placed across "on" solenoid coil 32 thereby closing the contacts of switch 30. Note that when switch arm 7 is moved downward and then released, it automatically returns to the central or neutral position. In other words leaf spring 51 is only momentarily closed on contact 53 to transmit the generated pulse to "on" reed coil 8 and then is returned to its rest position. Once the contacts of switch 30 have been closed they remain closed until switched open.

If now arm 7 is moved upward from the neutral or central position, the voltage induced in coil 5 is transmitted to "off" reed coil 12 via lines 11 and 13. When "off" coil 12 is energized, reed switch 14 is closed and the line voltage is placed across "off" solenoid coil 33. When "off" solenoid 33 is energized the contacts of switch 30 are latched open. Again, arm 7 automatically moves from the "off" position to the neutral position when released. Switch 30 will remain open when latched open until it is again closed by energizing "on" solenoid coil 32.

From the above description of the operation it is obvious that lines 9, 11 and 13 normally do not carry any current. The low voltage pulse generated when arm 7 is moved up or down is the only voltage carried by these lines. With this low voltage pulse no special heavy duty wiring is required. Furthermore, no transformer is needed to operate the system. All of the prior art systems known to the Applicant use a transformer to step down the line voltage and then use this reduced voltage to operate the control circuitry. With this invention, a transformer is totally unnecessary since the apparatus provides its own control voltage and the control voltage so generated can be transmitted from switch assembly 1 to relay assembly 2 by any suitable small gauge wire. In fact one could actually use a conductive paint and merely paint conductors 9, 11 and 13 along, for example, the surface of a wall interconnecting the switch and reed assemblies.

While briefly mentioned before, it is again noted that this invention can be used for remote control in any environment including a hazardous one. Since conductors 9, 11 and 13 do not continually carry any current, there is no heat generated in these conductors. In addition there is no contact arcing when switch arm 7 is switched to and from the "on" and "off" positions since no continually voltage source is connected to the contacts of switch assembly 1. Thus, it is obvious that this invention can be used in any environment including an explosive environment such as a hydrogen environment.

While the invention has been described with reference to a specific embodiment it will be obvious to those skilled in the art that various changes and modifications to the embodiment described can be made without departing from the spirit and scope of the invention as described in the appended claims.

What is claimed is:

1. Apparatus for remotely controlling the energization of a load comprising:
   a source of voltage;
   a relay assembly;
   a load;
   said relay assembly including means for selectively coupling and uncoupling said load and said voltage source;
   a switch assembly, said switch assembly including switch actuation means and electromechanical voltage generating means to generate a voltage pulse each time said switch assembly is actuated; and
   means to transmit said generated voltage pulse to said relay assembly to control said means for coupling and uncoupling said load and said voltage source.

2. The apparatus as defined in claim 1 wherein said means to generate said voltage pulse includes a magnet and armature assembly.

3. The apparatus as defined in claim 2 wherein said switch assembly actuation means comprises a switch handle operative from a neutral position to an "on" position and from said neutral position to an "off" position, said voltage generating means generating a voltage pulse each time said switch is moved from its neutral position.

4. The apparatus as defined in claim 3 wherein said switch assembly includes an "on" contact that is closed when said switch handle is moved from said neutral position to said "on" position and an "off" contact that is closed when said switch handle is moved from said neutral position to said "off" position.

5. The apparatus as defined in claim 4 wherein said means to transmit said generated voltage pulse to said relay assembly includes means to transmit a pulse to said load coupling and uncoupling means when said "off" contact is closed to uncouple said load from said source and when said "on" contact is closed to couple said load to said voltage source.

6. Apparatus for remotely controlling the energization of a load comprising:
   a source of voltage;
   a relay assembly;
   a load;
   said relay assembly including means to couple and uncouple said load and said voltage source;
   electromechanical voltage pulse generating means located remote from said relay assembly; and
   means to couple said voltage pulse generating means to said relay assembly.

7. The apparatus as defined in claim 6 wherein said voltage generating means includes a switch mechanism; a cylindrical magnet and a coil, said magnet cooperating with said coil to induce a voltage in said coil each time said switch mechanism is actuated.

8. The apparatus as defined in claim 6 wherein said voltage generating means comprises:
   a switch mechanism having "on" contact means and "off" contact means;
   a switch operator having a neutral position, an "off" position and an "on" position;
   means to maintain said switch operator normally in said neutral position such that said operator automatically returns to said neutral position after the operator has been moved from said neutral position to either said "on" or "off" position;
   first and second pawls operatively connected to said switch mechanism operator;
   a cylindrical magnet;
   an armature coil magnetically coupled to said magnet; and
   a sprocket coupled to said cylindrical magnet and positioned with respect to said first and second pawls such that movement of said switch mechanism operator from said neutral position to said "on" position causes said first pawl to engage said sprocket thereby rotating said magnet and inducing a voltage pulse in said armature coil and such that movement of said switch mechanism operator from said neutral position to said "off" position causes said second pawl to engage said sprocket thereby rotating said magnet and inducing a voltage in said armature coil.

9. The apparatus as defined in claim 8 wherein said sprocket is coupled to said magnet through a gear train comprising a first gear integrally fabricated with said sprocket and a second gear secured to said magnet.

10. The apparatus as defined in claim 9 wherein said means to couple said voltage pulse generating means to said relay assembly comprises:
    a first conductor connected between said armature coil and said relay assembly;
    a second conductor connected between said armature coil and a common contact of said switch mechanism;
    a third conductor connected between said "on" contact and said relay assembly; and
    a fourth conductor connected between said "off" contact and said relay assembly.

11. The apparatus as defined in claim 10 wherein said relay assembly comprises:
    a first reed relay responsive to said generated pulse when said operator is moved to said "on" position;
    a second reed relay responsive to said generated pulse when said operator is moved to said "off" position;
    a double solenoid having an "on" latch coil responsive to the closing of said first reed relay for coupling said load to said voltage source; and
    an "off" latch coil responsive to the closing of said second reed relay for uncoupling said load from said voltage source.

12. The apparatus as defined in claim 11 wherein said first reed switch when closed places said "on" latch coil across said voltage source and said second reed switch when closed places said "off" latch coil across said voltage source.

13. The apparatus as defined in claim 12 wherein a voltage source switch is responsive to a momentary energization of said "on" latch coil for coupling said load to said voltage source and is responsive to the momentary energization of said "off" latch coil for uncoupling said load from said voltage source.

14. The apparatus as defined in claim 13 wherein said first reed relay is connected to said third conductor and said second reed relay is connected to said fourth conductor.

15. In a system for remotely controlling the energization of a load, a switch assembly comprising:
   a common contact;
   an "on" contact;
   an "off" contact;
   an operator having a neutral position, an "on" position connecting said "on" contact to said common contact and an "off" position connecting said "off" contact to said common contact;
   means for automatically returning said operator to said neutral position from said "on" position and from said "off" position; and
   electromechanical pulse generating means responsive to the movement of said operator from said neutral position for generating a voltage pulse.

16. The switch assembly as defined in claim 15 wherein said means for generating a voltage pulse comprises a cylindrical magnet and an armature coil.

17. The switch assembly as defined in claim 16 wherein first and second pawls are operatively connected to said operator and a sprocket is coupled to said cylindrical magnet through a gear train whereby movement of said operator from said neutral position rotates said cylindrical magnet thereby inducing a voltage in said armature coil.

18. The switch assembly as defined in claim 17 wherein said armature coil has a first lead connected to said common contact and a second lead whereby movement of said operator to said "on" position provides a voltage pulse between said second lead and on said "on" contact and movement of said operator to said "off" position provides a voltage pulse between said second lead and said "off" contact.

19. The switch assembly as defined in claim 18 wherein said gear train comprises a first gear integrally formed with said sprocket and a second gear directly connected to said magnet, said first and second gears having a gear ratio such that a small degree of movement of said operator from said neutral position provides a proportionally large degree of movement of said magnet.

* * * * *